No. 865,161. PATENTED SEPT. 3, 1907.
W. H. COLDWELL.
LAWN MOWER.
APPLICATION FILED FEB. 20, 1907.
3 SHEETS—SHEET 1.
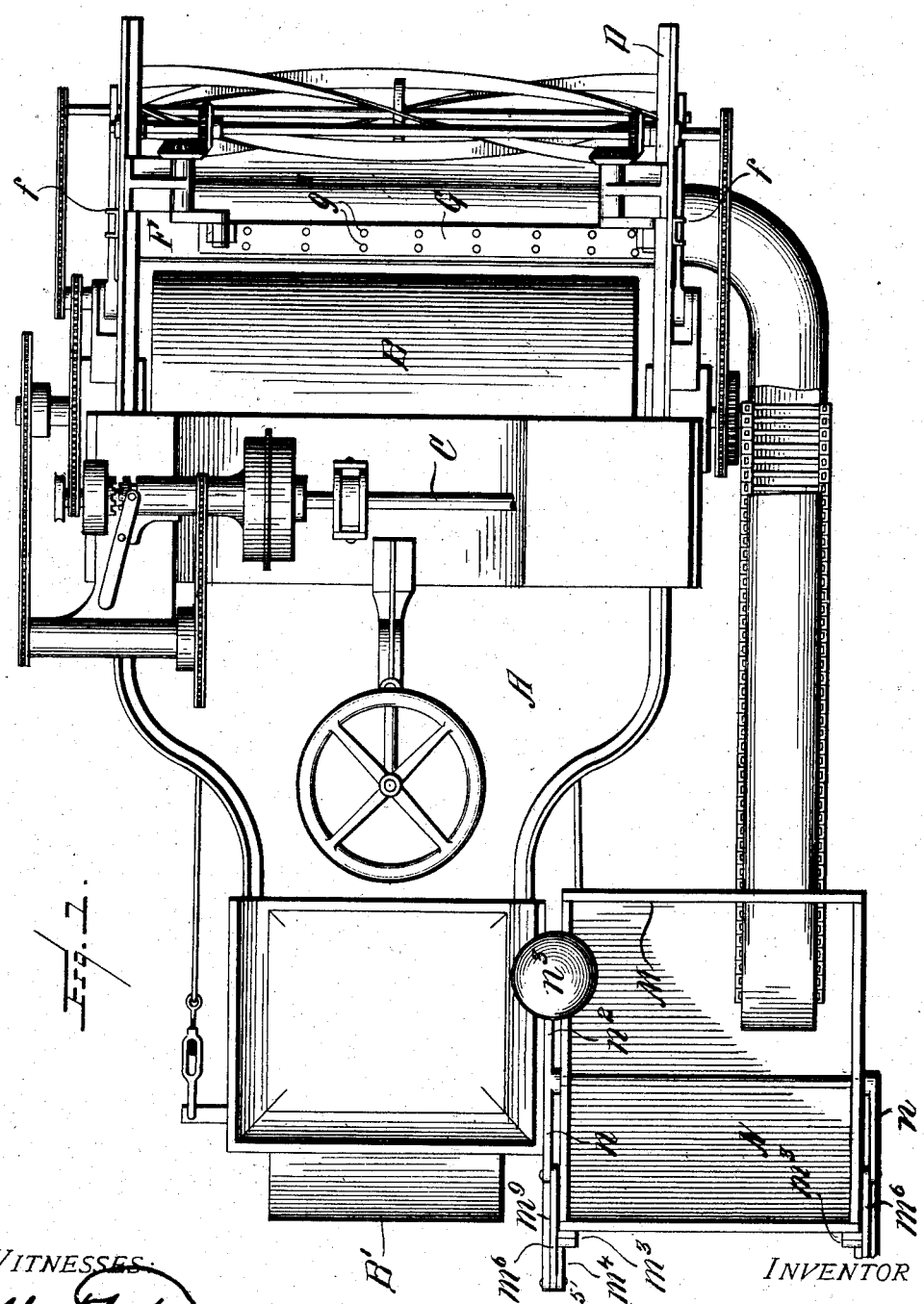
WITNESSES: INVENTOR
William H. Coldwell.
By
Attorneys

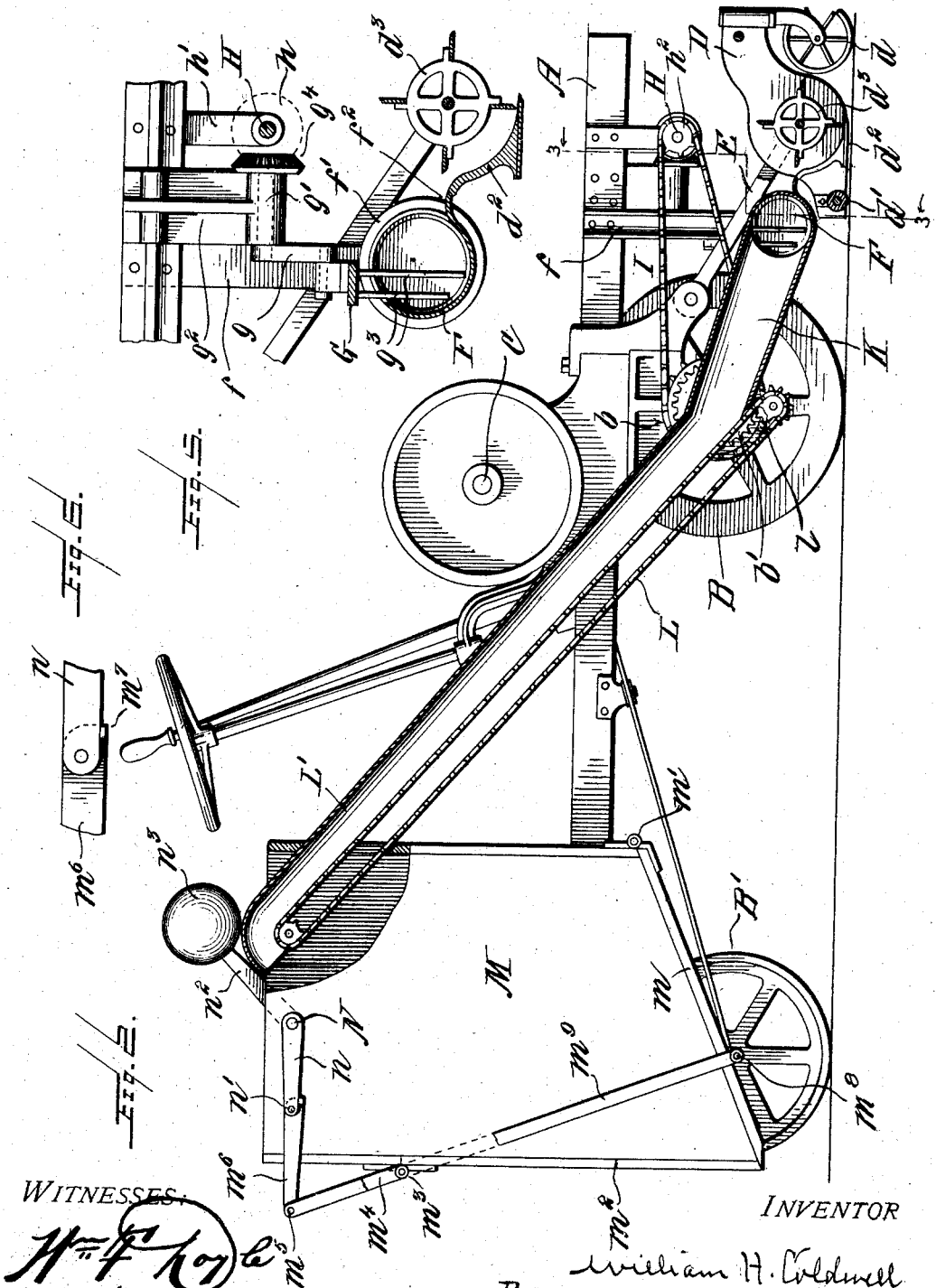

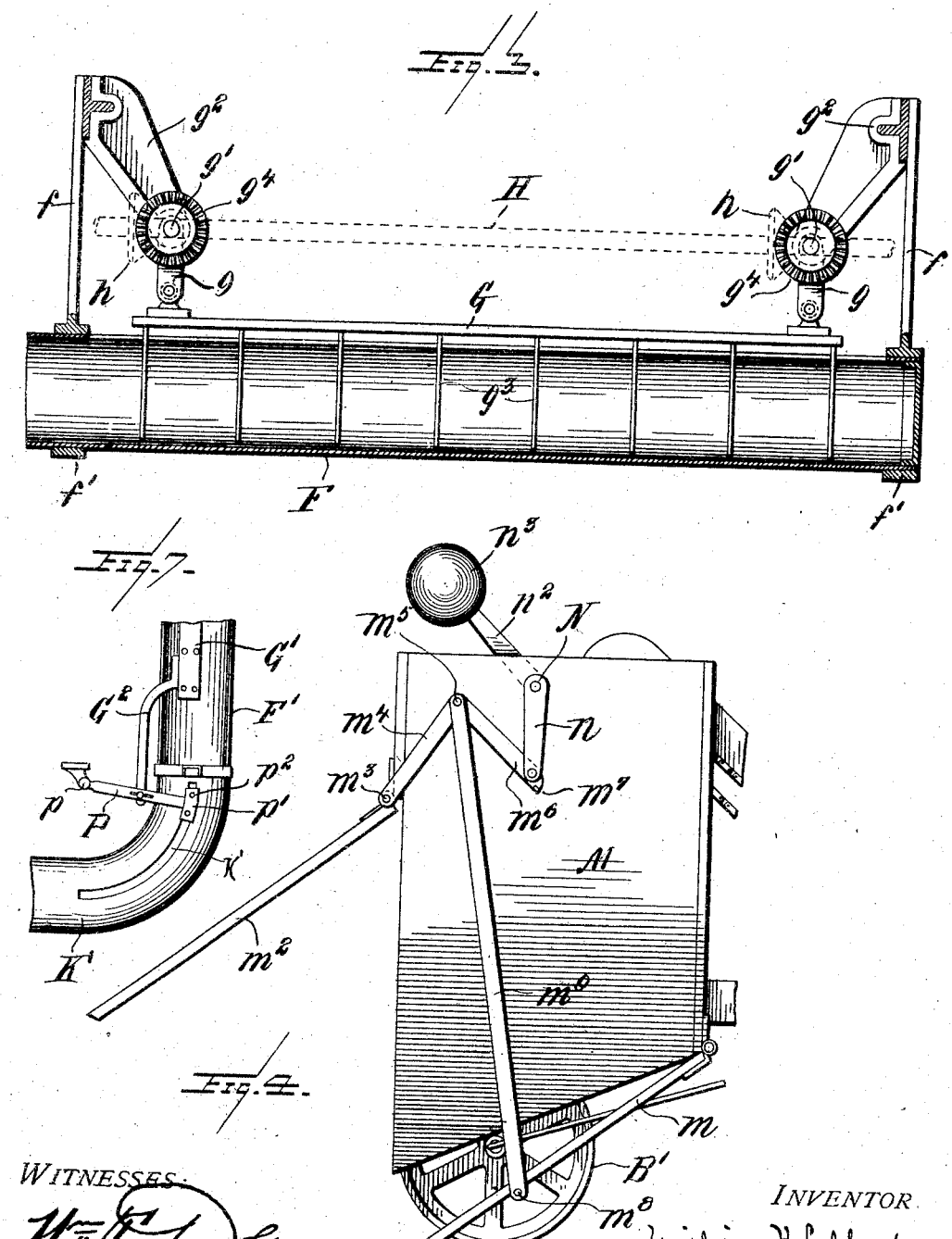

UNITED STATES PATENT OFFICE.

WILLIAM H. COLDWELL, OF NEWBURGH, NEW YORK.

LAWN-MOWER.

No. 865,161.   Specification of Letters Patent.   Patented Sept. 3, 1907.

Application filed February 20, 1907. Serial No. 358,381.

*To all whom it may concern:*

Be it known that I, WILLIAM H. COLDWELL, a citizen of the United States, residing at Newburgh, in the county of Orange and State of New York, have invented certain new and useful Improvements in Lawn-Mowers; and I do hereby declare the following to be a full, clear, and exact description of the invention, such as will enable others skilled in the art to which it appertains to make and use the same.

My invention is an improvement in lawn mowers and consists in the novel features hereinafter described, reference being had to the accompanying drawings which illustrate one form in which I have contemplated embodying the invention and my said invention is fully disclosed in the following description and claims.

Referring to the said drawings, Figure 1 is a plan view of a motor lawn mower having my invention embodied therein. Fig. 2 is a side elevation of the same, parts being shown in section. Fig. 3 is a transverse vertical section on line 3—3 of Fig. 2 drawn to an enlarged scale. Fig. 4 is a detail view of a part of the machine showing the grass box thereof with the doors in open or dumping position. Fig. 5 is an enlarged detail view of the receiving trough and the mechanism for feeding the grass therein transversely of the machine. Fig. 6 is a detail of one of the joints of the discharge mechanism for the grass box. Fig. 7 is a detail of a modification showing a feeding device for the elbow, connecting the trough and conveyer.

My invention consists in means for collecting and intermittently discharging the grass cut by a lawn mower. It is applicable to either hand mowers, horse propelled mowers or motor propelled mowers, but is especially adapted to a horse mower or motor propelled mower, and is herein shown and described in connection with a motor lawn mower.

In carrying out my invention I provide a trough or receptacle adjacent to the rotary cutter of the lawn mower, which receives the cut grass and which is provided with means for conveying the cut grass laterally and discharging it at one side of the machine, preferably on the side adjacent to the mown portion of the lawn, where it can be gathered up and removed. I prefer to provide a grass box or receptacle of a capacity considerably greater than that of the said trough, and which may be dumped or discharged at intervals, and to provide suitable means, such as a belt conveyer to carry the cut grass from the discharge end of said trough to the grass box where it accumulates until full, thus permitting the cut grass to be dumped in large quantities and at intervals, and saving much time and labor in clearing the lawn of the cut grass.

In the drawings I have shown a "Coldwell motor lawn mower" with my invention embodied therein but as before stated it can be also used with horse or hand mowers if desired. The particular construction of the motor mower is not involved in this application and so much only of its structure as is desirable to a clear understanding of the present invention, will be described.

A represents the motor frame of the motor mower, supported by the front lawn rolling roller B, and rear lawn rolling and steering roller B′.

C represents the main shaft of the motor (not shown) which is preferably a gasolene explosive engine, but may be any desired form of motor.

D represents the mower frame supported in this instance by caster wheels $d$ and guard roller $d'$ and carrying the stationary and rotary cutters $d^2$, $d^3$, and E represents push arms connecting the motor frame with the mower frame, so as to propel the mower frame in advance of the rollers B, B. Suitable mechanism is provided for driving the rollers B, B and the rotary cutter $d^3$ from the motor in the usual or any preferred manner, which mechanism forms no part of the present invention.

F represents the receiving trough or receptacle, which is preferably in the form of a segment of a cylinder, as shown, and extends transversely across the machine adjacent to the cutting mechanism and in such position that the cut grass will be deposited in it by the operation of the machine. In the present instance the trough F is located immediately in rear of the cutters, and is supported by two depending arms $f f$ secured to the motor frame, each carrying a ring $f'$ in which the ends of the semi-tubular receptacle are fitted. The trough F can be conveniently left entirely cylindrical at each end where it engages the rings $f' f'$, and can be cut away only immediately in rear of the rotary cutter and I prefer to extend the front wall of the trough F forward in a lip $f^2$, as shown, which engages the upper edge of the stationary cutter and prevents the dropping of the cut grass in rear thereof. It is obvious that with this construction the cut grass will be thrown by the rotary cutter into the trough F which is closed at one end and is provided with means for feeding the grass toward the opposite end.

Above the trough is a horizontal feed bar G supported by two cranks $g g$, connected with crank shafts $g' g'$, mounted in brackets $g^2 g^2$ secured to the motor frame A, and the feed bar G is provided with a plurality of downwardly projecting teeth $g^3$ which extend to a point close to the bottom of the trough when the cranks are in their lowest positions as seen in Fig. 5.

The crank shafts $g'$ are each provided with a bevel pinion $g^4$ which meshes with a similar pinion $h$ on a transverse shaft H, mounted in hangers $h'$ secured to the motor frame, and said shaft H is driven in any suitable manner, in this instance by means of sprocket chain I which passes around a sprocket $b$, on the shaft of the roller B, and a small sprocket $h^2$ on the shaft H. The operation of shaft H causes the feed bar G to feed the cut grass in the trough F to one side of the machine, that is longitudinally of the trough and transversely of the machine. If desired the grass can be delivered in a stream from the discharge end of said trough upon the surface of the cut portions of the lawn, adjoining the swath which is being cut, but I prefer to convey it to a grass box and collect it until the said box is filled and then dump the entire contents of the grass box. To this end I attach to the discharge end of the trough F a curved "elbow" of piping, indicated at K, the delivery end of which discharges the cut grass upon an inclined conveyer L which carries it upwardly and rearwardly and delivers it to a grass box M, supported at the rear of the machine from the motor frame in any desired manner. I prefer to make the motor frame A narrower at the rear than it is at the front, as shown, so that the grass box and conveyer may be attached to the machine without greatly adding to the width of the machine, but this while desirable, is not essential.

The conveyer L may be of any preferred construction and is operated preferably from the shaft of the front roller B, by means of a gear $l$ on the lower shaft of the conveyer meshing with a gear $b'$ on the roller shaft, as shown, or in any other suitable manner. I also prefer to provide the conveyer with a hood or casing $L'$ extending from the elbow K to the grass box to prevent the grass from jarring off of the conveyer.

The grass box M is provided with a bottom $m$ hinged at $m'$ at its forward edge, and when closed, normally lies in a downwardly inclined position from front to rear. The rear wall of the grass box is also provided with a hinged lower portion or door $m^2$, hinged at $m^3$, and having its lower edge meeting the rear edge of the hinged bottom $m$. The rear door is provided, preferably at each side with an operating arm $m^4$ rigidly secured thereto and extending upwardly and rearwardly from the hinge $m^3$, where it is pivoted at $m^5$ to one end of a link $m^6$, the other end of which is pivoted at $n'$ to a crank $n$, on a tripping shaft N, extending across the grass box, the link $m^6$ and crank arm $n$ being in a straight line between the pivot $m^5$ and crank shaft N when the doors are closed, and thus preventing the arm $m^4$ from moving forward. The shaft N is provided at one side (or both sides) with an arm $n^2$ carrying a weight $n^3$. The crank shaft is provided with some form of stop for limiting the movement of the weighted lever, when the parts are in the position shown in Fig. 2 and this is conveniently effected by providing one of the parts $m^6$, or $n$ with a lug $m^7$ in this instance formed on the part $m^6$ so that the joint at $n'$ will not bend in an upward direction as indicated in detail in Fig. 6, but this result may be accomplished in other ways.

The movable bottom $m$ is provided with a bail comprising in this instance a cross bar $m^8$, and two side links or rods $m^9$ $m^9$ which are arranged to lie exactly in line with the arms $m^4$, and the hinge $m^3$ when the bottom is in closed position and are connected at their upper ends, to the pivots $m^5$ as shown in Figs. 1, 2 and 3. It will, therefore, be seen that when the door $m^2$ and bottom $m$ are in closed position the rear door $m^2$ is held locked by the crank arm $n$ and link $m^6$, being in a straight line to shaft N, and the bottom $m$ is similarly locked in closed position since the downward pull on the side bars or links $m^9$ $m^9$ is directly upon the hinges $m^3$ through the arms $m^4$.

To discharge the contents of the grass box, it is only necessary to rock the weighted arm $n^2$ rearwardly, when the parts assume the positions shown in Fig. 4, the bottom $m$ being lowered to the ground and the rear door being opened outwardly and rearwardly, thus facilitating the quick discharge of the contents of the box or receptacle.

When the motor mower is in operation, the cut grass is caught in the trough F and is continuously fed longitudinally thereof, and transversely of the machine, into the elbow K the interior of which is made perfectly smooth so that the grass passes easily through the elbow and is delivered upon the conveyer L which deposits it in the grass box M. When the box M is full, the operator will dump its contents and the grass may be delivered from the trough F directly upon the conveyer but I prefer the construction shown as it enables a shorter conveyer to be used. If necessary or desirable, the elbow K may be provided with a feed bar provided with teeth extending through a slot in the top of the elbow, and working on an arc of a circle, to facilitate the passage of the cut grass through the elbow, but this will ordinarily not be required. I have shown such a construction in Fig. 7 in which $K'$ represents the elbow and $F'$ the trough. $G'$ represents the feed bar for the trough F, which is provided in this instance with a rigid arm $G^2$, the outer end of which carries a pin which works in a slot in an arm P, supported at its inner end by an universal joint $p$, from the main frame and carrying at its outer end a short bar $p'$ provided with teeth $p^2$ extending through a slot $k'$ in the top of the elbow $K'$. The teeth operate similarly to those of the feed bar $G'$ but in the arc of a circle, and will positively feed the grass through the elbow $K'$ to the conveyer.

While I have shown the grass box located upon and carried by the motor frame of the machine, this being my preferred construction, it is obvious that the conveyer can be arranged to deposit the cut grass in a grass box or vehicle separate from the motor frame. For example, I may employ a separate grass receptacle supported upon its own wheels or rollers, and connected to the motor lawn mower so as to be drawn along with the same, and in such case the conveyer will be arranged to deliver the cut grass into such auxiliary receptacle.

The specific construction of the grass box herein shown and described, is not claimed herein, as it will form the subject matter of a separate application.

What I claim and desire to secure by Letters Patent is:—

1. The combination with a lawn mower, of a grass receptacle located adjacent to the cutting mechanism, extending transversely of the machine, and provided with a discharge aperture at one side of the machine, and mechanism for feeding the cut grass longitudinally of said receptacle toward the discharge aperture, substantially as described.

2. The combination with a lawn mower, of a grass receptacle, located adjacent to the cutting mechanism, and constructed to receive the cut grass therefrom, said receptacle extending transversely across the machine and having a discharge aperture at one end, feeding mechanism for carrying the cut grass longitudinally of said receptacle toward the discharge aperture, and mechanism for continuously operating said feeding mechanism, substantially as described.

3. The combination with a lawn mower, of a grass receptacle located adjacent to the cutting mechanism and constructed to receive the cut grass therefrom, said receptacle extending transversely of the machine, feeding mechanism for feeding the cut grass in said receptacle toward one end of said receptacle, a grass box, and mechanism for conveying the cut grass from the discharge end of the grass receptacle to the grass box, substantially as described.

4. The combination with a lawn mower, of a grass receptacle located adjacent to the cutting mechanism disposed transversely of the machine and constructed to receive the cut grass therefrom, a feed bar disposed transversely of the machine and provided with teeth extending into said receptacle, crank shafts and cranks supporting said feed bar, and mechanism for operating said cranks to feed the cut grass in said receptacle toward one end of the same, substantially as described.

5. The combination with a lawn mower, of a grass receptacle located adjacent to the cutting mechanism, constructed to receive the cut grass therefrom, said receptacle extending transversely of the machine, feeding mechanism for feeding the cut grass in said receptacle toward one end thereof, a conveyer located at one side of the machine, constructed to receive the cut grass from said receptacle, a grass box carried by the lawn mower, located adjacent to the delivery end of said conveyer, and means for dumping the contents of said grass box, substantially as described.

6. In a motor lawn mower, the combination with a motor frame provided with a lawn rolling roller, and a mower frame provided with cutting mechanism, of a grass receptacle located adjacent to said cutting mechanism and disposed transversely of the machine, feeding mechanism for feeding the cut grass in said receptacle toward one end of the same, a grass box carried by said motor frame, and a conveyer for carrying the cut grass from the discharge end of said receptacle to the grass box, substantially as described.

7. The combination with a lawn mower provided with a lawn rolling roller, and cutting mechanism, arranged in front of said roller, of a grass receptacle located adjacent to the cutting mechanism, between said cutting mechanism and said rollers, and disposed transversely of the machine, feeding mechanism for feeding the cut grass in said receptacle longitudinally thereof toward one end of said receptacle, a grass box carried by the lawn mower, and a conveyer for carrying the cut grass from the discharge end of said receptacle to the grass box, substantially as described.

8. The combination with a lawn mower having a lawn rolling roller, and cutting mechanism located forward of said roller, of a grass receptacle extending transversely across the machine, adjacent to the cutting mechanism, and forward of the lawn rolling roller, said receptacle having a discharge aperture at one end, a feeding mechanism for said receptacle for feeding the cut grass toward said discharge aperture, and mechanism for operating said feed mechanism continuously, substantially as described.

9. The combination with a lawn mower provided with a motor frame provided with a lawn rolling roller, and a separate frame forward of the said roller, carrying the cutting mechanism, and connections between said frames permitting them to move with respect to each other, of a grass receptacle, carried by said motor frame extending transversely across the machine, located adjacent to the cutting mechanism, and having a discharge aperture at one end, a feeding mechanism for feeding the cut grass in said receptacle toward said discharge aperture, and mechanism carried by the motor frame, for supporting and continuously operating said feeding mechanism, substantially as described.

In testimony whereof I affix my signature, in the presence of two witnesses.

WILLIAM H. COLDWELL.

Witnesses:
EDWARD C. ROSS,
HENRY W. MURTFELDT.